United States Patent [19]
Motomura et al.

[11] Patent Number: 6,111,559
[45] Date of Patent: *Aug. 29, 2000

[54] LIQUID CRYSTAL DISPLAY DEVICE

[75] Inventors: Kensuke Motomura, Saitama; Susumu Tsuchida, Tokyo; Yoshihide Nagatsu, Kanagawa, all of Japan

[73] Assignee: Sony Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/598,022

[22] Filed: Feb. 7, 1996

[30] Foreign Application Priority Data

Feb. 28, 1995 [JP] Japan ................................. 7-040570

[51] Int. Cl.⁷ .................................................. G09G 3/36
[52] U.S. Cl. .......................................... 345/102; 345/211
[58] Field of Search ............................... 345/102, 98, 87, 345/147, 77, 211, 212, 67; 349/61, 62, 63, 65, 69, 70

[56] References Cited

U.S. PATENT DOCUMENTS 5,247,286  9/1993  Ishikawa ................................. 345/102
5,313,225  5/1994  Miyadera ............................... 345/102
5,406,305  4/1995  Shimomura ........................... 345/102

FOREIGN PATENT DOCUMENTS 0342835  11/1989  European Pat. Off. .

OTHER PUBLICATIONS

JP 01 007 867 A (Fujitsu General Ltd) Jan. 11, 1989.
JP 03 179 886 A (Toshiba Corp.) Aug. 5, 1991.
JP 07 129 113 A (Sharp Corp.) May 19, 1995.
JP 09 244 548 A (Canon Inc.) Sep. 19, 1997.

*Primary Examiner*—Regina Liang
*Attorney, Agent, or Firm*—Jay H. Maioli

[57] ABSTRACT

A liquid crystal display apparatus having an amplitude detecting unit for detecting an amplitude of a supplied video signal; a liquid crystal display for displaying an image on a main surface based on the video signal; a backlight for giving off light with a luminance which can be freely set from the back surface of the liquid crystal display to the main surface; and a luminance setting unit for variably setting the luminance of the backlight based on the amplitude detected by the amplitude detecting unit.

4 Claims, 4 Drawing Sheets

LIQUID CRYSTAL DISPLAY DEVICE

BACKGROUND OF THE INVENTION

The present invention relates to a liquid crystal display apparatus, more particularly relates to a liquid crystal display apparatus provided with a liquid crystal display with a luminance which is adjusted using a backlight.

A liquid crystal display apparatus and 30 is provided with, for example, as shown in FIG. 1, a timing signal generation circuit 31 which generates a timing signal when supplied with a horizontal/vertical synchronization signal; a liquid crystal display 32 in which transparent electrodes are arranged in the form of matrix to form pixels; a column driver 33 which is supplied with a video signal and drives the electrodes of the pixels of every horizontal line of the liquid crystal display 32 at the video signal level of a the respective pixels; a line driver 34 which drives the pixels for each of the horizontal lines; and a backlight 35 which irradiates light from the back surface to the main surface of the liquid crystal display 32.

In the liquid crystal display apparatus 30, in a state where light is irradiated to the liquid crystal display 32 from the backlight 35, the column driver 33 and the line driver 34 are synchronized by a timing signal, and a video image is output from the liquid crystal display 32 by the video signal of every pixel supplied with the video signal level by the column driver 33, to the pixels of every horizontal line sequentially driven by the line driver 34.

In the liquid crystal display apparatus 30, however, when the video signal level is small, the video signal level is amplified or the zero level of the video signal level is raised in accordance with the video signal level, whereby the video signal level is brought to a high level and the video image is output from the liquid crystal display 32. However, where the video signal level is amplified when the video signal level is extremely small, the amplification rate becomes extremely large, a distortion occurs in the video signal, and there arise problems that the quality of the image is deteriorated or the output image unnaturally changes at the switching of the amplification rate. Also, where the zero level is raised, there arises a problem that there are few color tones which can be displayed and deterioration of the image such as pseudo contours occur.

Also, in the liquid crystal display apparatus 30, when the video signal level of the video signal transitionally changes such as for example at the time of selection of a station, when the power source voltage is turned ON/OFF, etc., by outputting the image while fixing the video signal level to a black level etc., the quality of the picture of the output image of the liquid crystal display 32 is improved.

However, the column driver 33 of the liquid crystal display 32 and the line driver 34 are driven by the black signal level etc. and the backlight 35 is turned on, therefore there arises a problem that the power consumption is large.

OBJECT AND SUMMARY OF THE INVENTION

In consideration with of the problems as described above, an object of the present invention is to provide a liquid crystal display apparatus which does not deteriorate the image quality even when the video signal level is small and that can operate with a low power consumption.

To achieve this object, according to a first aspect of the invention, the liquid crystal display apparatus is provided with an amplitude detecting means for detecting an amplitude of a supplied video signal; a liquid crystal display for displaying an image on a main surface based on the video signal; a backlight for emitting a light from the back surface of the liquid crystal display to the main surface, the light emitted from the backlight having a luminance which is set variably; and a luminance setting means for variably setting the luminance of the backlight based on the amplitude detected by the amplitude detecting means.

According to a second aspect of the invention, the liquid crystal display apparatus is provided with an amplitude detecting means for detecting the amplitude of a supplied video signal; an amplifier for amplifying the video signal and having an amplification rate which can be freely set; a liquid crystal display for displaying an image on the main surface based on the video signal supplied from the amplifier; a backlight for emitting a light from the back surface of the liquid crystal display to the main surface, the light emitted from the backlight having a luminance which is set variably; and an intensity setting means for variably setting the luminance of the backlight and the amplification rate of the amplifier based on the amplitude detected by the amplitude detecting means.

According to a third aspect of the invention, the liquid crystal display apparatus is provided with a time counting means for counting a time of continuation of a non-signal level of the supplied video signal; a liquid crystal displaying for display an image on the main surface based on the video signal; a backlight for emitting a light from the back surface of the liquid crystal display to the main surface, the light emitted from the backlight having a luminance which is set variably; and a luminance setting means for variably setting the luminance of the backlight based on the continuation time counted by the time counting means.

According to a fourth aspect of the invention, the liquid crystal display apparatus is provided with a transitory signal detecting means for detecting the transitory state of the supplied video signal; a liquid crystal display for displaying an image on the main surface based on the video signal; a backlight for emitting a light from the back surface of the liquid crystal display to the main surface, the light emitted from the backlight having a luminance which is set variably; and a luminance setting means for variably setting the luminance of the backlight when the transitory state is detected by the transitory signal detecting means.

According to the liquid crystal display apparatus of the present invention provided with the above configurations, when the amplitude of the video signal detected by the amplitude detecting means is small, it is possible to lower the luminance of the backlight by the luminance setting means so as to suppress a reduction in the intensity which can be displayed by the liquid crystal display.

Also, when the amplitude of the video signal detected by the amplitude detecting means is small, it is possible to lower the luminance of the backlight and increase the amplification rate of the amplifier by the intensity setting means so as to suppress the reduction of the intensity which can be displayed by the liquid crystal display.

Further, when the predetermined time is counted by the time counting means, it is possible to reduce the luminance or stop the emission of the backlight by the luminance setting means, whereby the liquid crystal display displays an image by a black level etc.

Still further, when a transitory state of the video signal is detected by the transitory signal detecting means, it is possible to lower the luminance or stop the emission of the backlight by the luminance setting means, whereby the liquid crystal display displays an image by a black level etc.

BRIEF DESCRIPTION OF THE DRAWINGS

The present invention may be more fully understood from the description of the preferred embodiments of the invention set forth below, together with the accompanying drawings, in which.

DETAIL DESCRIPTION OF THE PREFERRED EMBODIMENTS

Figure 1:
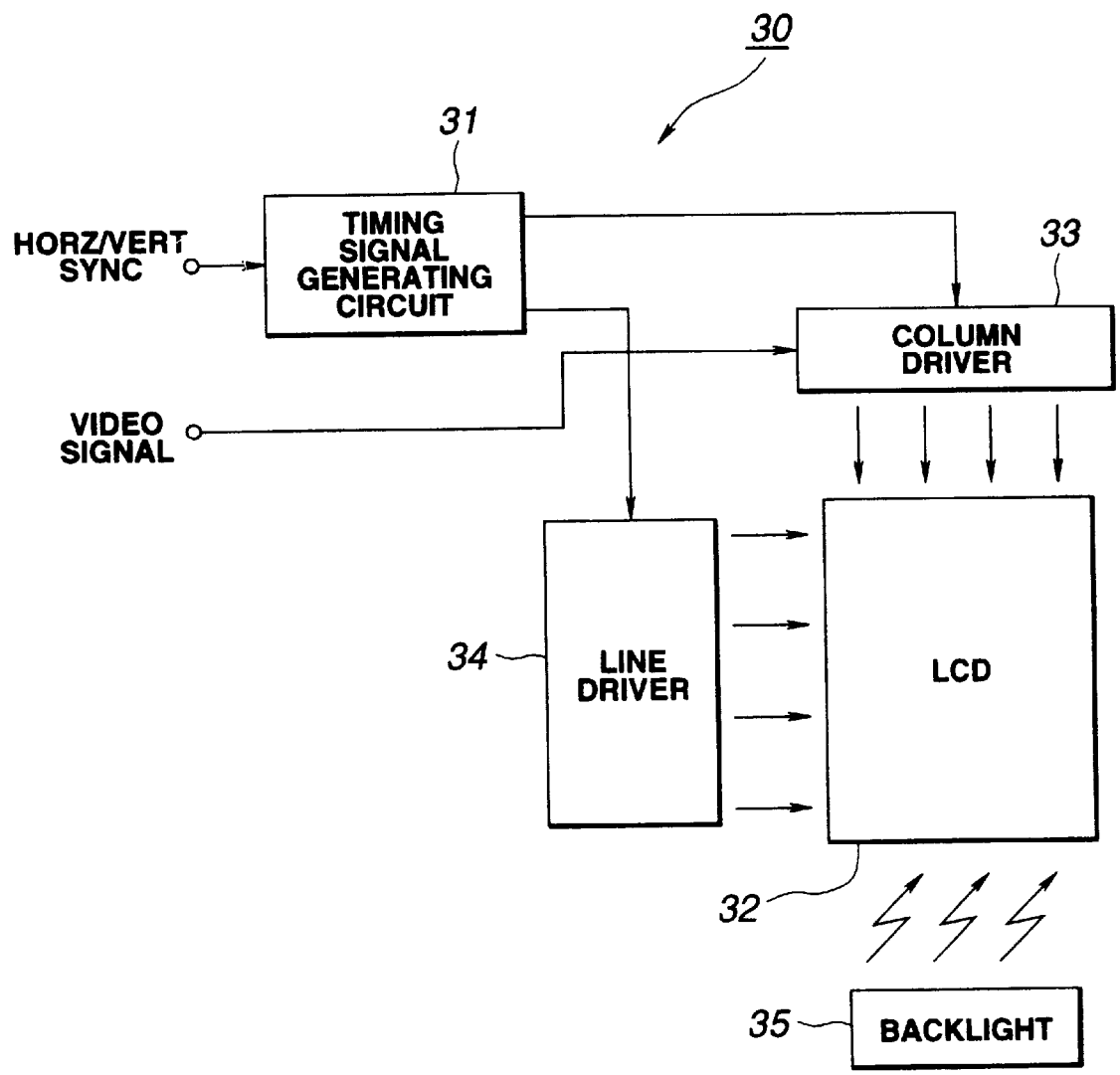
FIG. 1 is a block diagram of a conventional liquid crystal display apparatus.

Below, an explanation will be made of a preferred embodiment of a liquid crystal display apparatus according to the present invention by referring to the drawings.

The liquid crystal display apparatus according to the present invention is a liquid crystal display apparatus which displays a video signal by a liquid crystal display and which is suitable for use for example for a wall type TV receiver, a thin TV receiver for multi-media, etc.

Figure 2:
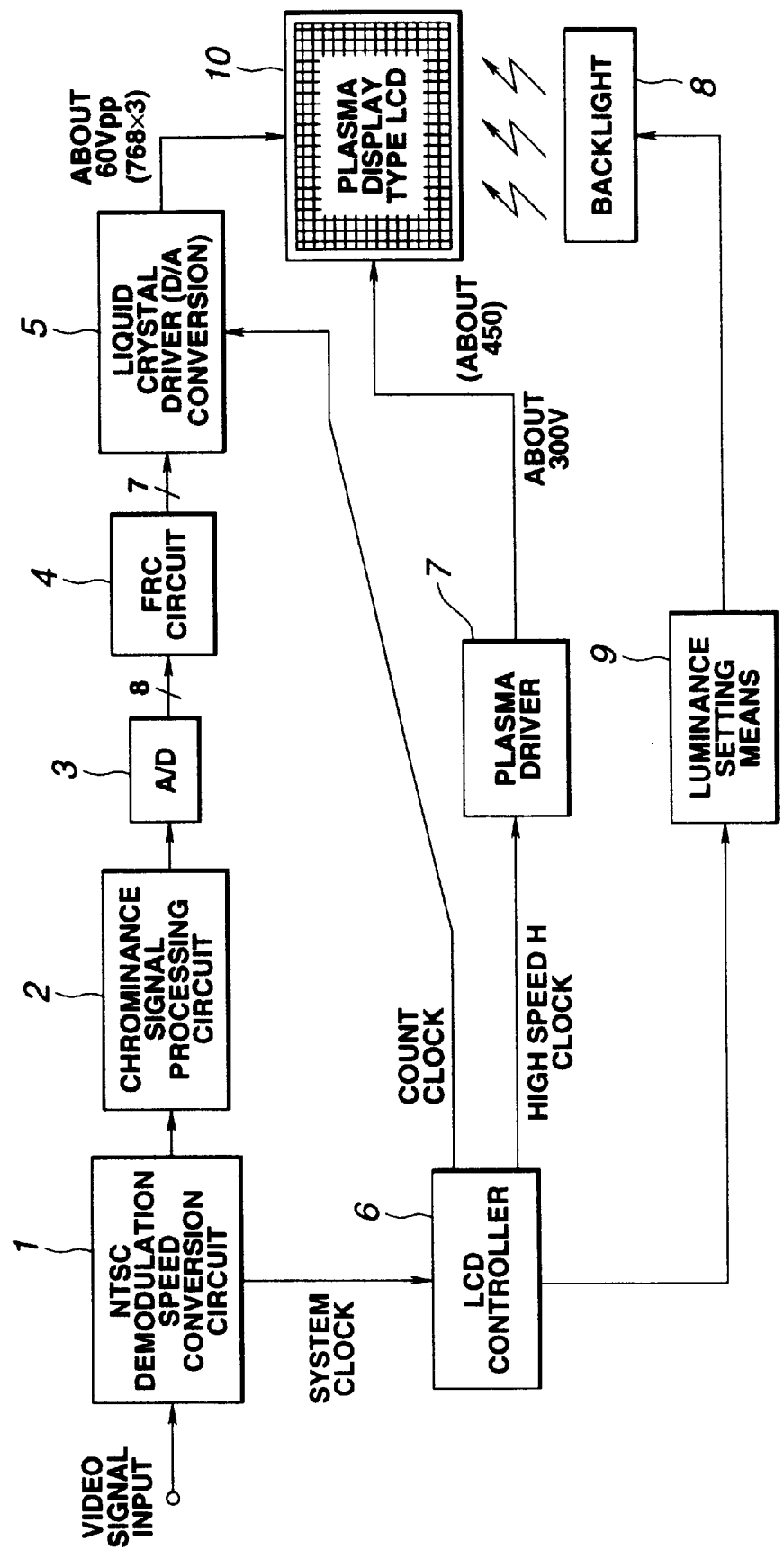
FIG. 2 is a block diagram of a liquid crystal display apparatus according to the present invention.

The liquid crystal display apparatus is provided with, as shown in FIG. 2, an NTSC demodulation speed conversion circuit 1 to which the video signal is supplied; a chrominance signal processing circuit 2 which converts the video signal supplied from the NTSC demodulation speed conversion circuit 1 to an RGB signal; an A/D converter 3 which performs A/D conversion for the RGB signal supplied from the chrominance signal processing circuit 2; an FRC circuit 4 which converts the frame rate of the RGB signal supplied from the A/D converter 3; a liquid crystal driver 5 which performs driving so as to supply the video signal level to the pixels of every horizontal line of a plasma address liquid crystal display (hereinafter referred to as a PALC) 10 based on the RGB signal supplied from the FRC circuit 4; a liquid crystal display controller 6 which generates a timing signal in synchronization with the video signal supplied from the NTSC demodulation speed conversion circuit 1; a plasma driver 7 which drives the pixels of every horizontal line of the PALC 10 based on the timing signal; a backlight 8 which gives off light to the PALC 10; a luminance setting means 9 which adjusts the luminance of the backlight 8; and a PALC 10 which is driven by the liquid crystal driver 5 and the plasma driver 7 and displays an image with the luminance of the backlight 8 adjusted by the luminance setting means 9.

The NTSC demodulation speed conversion circuit 1 is supplied with an NTSC composite video signal for a UHF broadcast from a UHV tuner, for a VHF broadcast from the a VHF tuner, and for a BS broadcast from a BS tuner by the switching of a control unit (not shown) provided on the outside of the liquid crystal display apparatus.

This NTSC demodulation speed conversion circuit 1 is provided with a demodulation unit which demodulates the NTSC composite video signal to a luminance signal and to a chrominance signal based on the luminance signal; a frame memory storing the chrominance signal for every frame; a movement detection unit which detects the movement of the image from the chrominance signal stored in the frame memory; and an interpolation processing unit which applies interpolation processing to the chrominance signal based on the movement detection unit. In a static picture region in which the nonexistence of movement is detected by the movement detection unit, the signal is read out continuously at double speed from the frame memory. In the moving picture region in which existence of movement is detected at the movement detection unit, internal interpolation is carried out at the video signal level of the horizontal lines above and beneath each horizontal line, the signal is read out at double speed, is converted to a non-interlace signal of 525 H/60 Hz, and is supplied to the chrominance signal processing circuit 2. The luminance signal demodulated at the demodulation unit and the non-interlace signal are supplied to the liquid crystal display controller 6.

The chrominance signal processing circuit 2 adjusts the color hue of the chrominance signal supplied from the NTSC demodulation speed conversion circuit 1 and applies inverse matrix conversion processing to this to generate an RGB signal.

In the A/D converter 3, the video signal level of the RGB signal supplied from the chrominance signal processing circuit 2 is subjected to A/D conversion with a quantization precision of 8 bits.

In the FRC circuit 4, rounding processing of the least significant bit of the RGB signal digitalized with the quantization precision of 8 bits supplied from the A/D converter 3 is applied, and the resultant signal is converted to the RGB signal quantized by 7 bits.

In the liquid crystal driver 5, the video signal level of the video signal of each RGB having a resolving power of 7 bits which is supplied from the FRC circuit 4 is formed by 128 tones and is supplied to the transparent electrodes of the pixels of every horizontal line of the PALC 10 to drive the same.

The liquid crystal display controller 6 generates a timing signal based on the luminance signal supplied from the NTSC demodulation speed conversion circuit 1 for every pixel of the PALC 10 and generates a high-speed H clock signal based on the non-interlace signal. It supplies the timing signal to the liquid crystal driver 5 and plasma driver 7 and supplies the high-speed H clock signal to the plasma driver 7.

Figure 3:
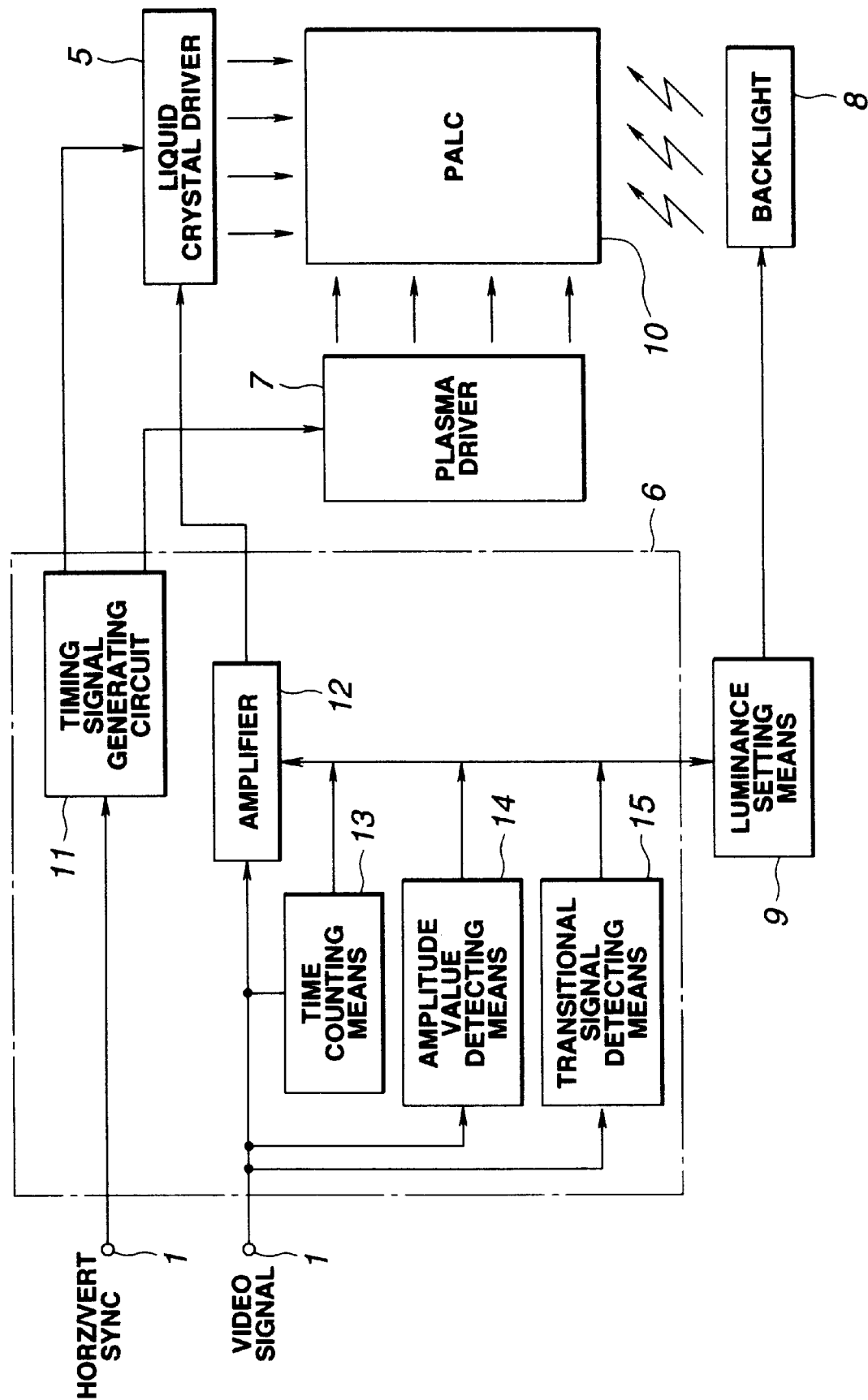
FIG. 3 is a block diagram of a principal part of a liquid crystal display apparatus.

The liquid crystal display controller 6 is provided with, as shown in FIG. 3, a timing signal generation circuit 11 which is supplied with the horizontal/vertical synchronization signal from the NTSC demodulation speed conversion circuit 1 and generates the timing signal for operating the liquid crystal driver 5 and the plasma driver 7 in synchronization; an amplifier 12 which amplifies the video signal supplied from the NTSC demodulation speed conversion circuit 1 to any variably set amplification rate; a time counting means 13 for counting the time continued when the video signal level of the video signal is the predetermined level or less; an amplitude detecting means 14 for detecting the amplitude of the video signal level of the video signal; and a transitory signal detecting means 15 for detecting a transitory state of the video signal.

In the time counting means 13, when the video signal level is the non-signal level or more, the count value is reset and the time when the video signal level is the non-signal level is counted. When the counted time becomes the predetermined time or longer, the luminance of the backlight 8 is lowered by the luminance setting means 9.

In the amplitude detecting means 14, the amplitude of the video signal level is detected. When the amplitude is the predetermined level or less, the amplification rate of the amplifier 12 is increased in accordance with the video signal level and, at the same time, the luminance of the backlight 8 is lowered by the luminance setting means 9. Also, when the amplitude is at the predetermined level or more, the amplification rate of the amplifier 12 is brought to "1".

In the transitory signal detecting means 15, the transitory state of the video signal at the time of selection of a station and at the time of the power source voltage is turned on or off is detected. The luminance of the backlight 8 is lowered by the luminance setting means 9 when detecting a transitory state.

In the liquid crystal display controller 6 of the above configuration, when the video signal is not supplied, the luminance of the backlight 8 is lowered by the luminance setting means 9 based on the count result of the time counting means 13. Also, where the video signal level is small, the video signal level is amplified by the amplifier 12 based on the detection result of the amplitude detecting means 14 and, at the same time, the luminance of the backlight 8 is lowered by the luminance setting means 9. Also, when the video signal is in a transitory state, the luminance of the backlight 8 is lowered by the luminance setting means 9.

The plasma driver 7 drives the PALC 10 so as to sequentially perform switch scanning of the cathode and anode electrodes of the plasma chambers of the PALC 10 in a horizontal direction in synchronization with the liquid crystal driver 5 during a period when the liquid crystal driver 5 drives the transparent electrodes of every horizontal line of the PALC 10 and sequentially performs plasma discharging of the plasma chambers. The backlight 8 is provided so as to emit a light from the back-surface to the main surface of the PALC 10 so that the luminance is set variably.

The luminance setting means 9 lowers the luminance by lowering the power to be supplied to the backlight 8 when the non-signal level is detected for the predetermined time or more at the time detecting means 13, or stops the supply of the power, thereby to stabilize the screen of the PALC 10 and suppress the power consumption of the backlight 8. Also, it lowers the power supplied to the backlight 8 in accordance with the lowering of the video signal level based on the detection result of the amplitude detecting means 14 and lowers the luminance, thereby to suppress the reduction of the intensity which can be displayed by the PALC 10.

Figure 4:
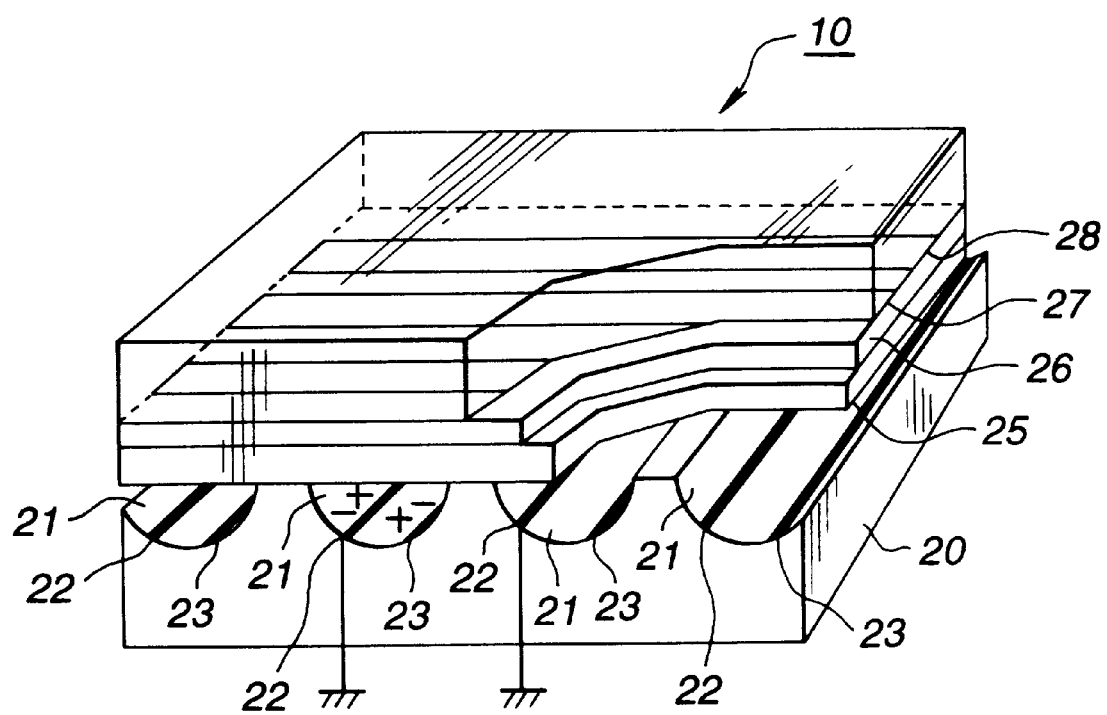
FIG. 4 is a view of the configuration of a liquid crystal display of the liquid crystal display apparatus.

The PALC 10 is a liquid crystal display of a system driving the pixels by utilizing the discharged plasma. Examples of a plasma address liquid crystal apparatus which a liquid crystal display having a large screen can be produced at low cost with a high manufacturing yield and which realizes a high resolution and high contrast are disclosed in for example Japanese Unexamined Patent Publication No. Hei 1-217396 and Japanese Unexamined Patent Publication No. Hei 4-265931. In this PALC 10, plasma chambers 21 provided in a glass substrate 20 and a liquid crystal layer 26 which is an electro-optic material are arranged so as to face each other via a sheet 25 of a thin dielectric body made of glass or the like as shown in FIG. 4. The plasma chambers 21 are constituted by forming a plurality of grooves in parallel to each other on a top face of the glass substrate 20. For example, 450 grooves are formed. In the respective grooves, a gas which can be ionized such as helium, neon, argon, or a mixed gas of them is sealed. Also, in each of the grooves, a pair of an anode electrode 22 and a cathode electrode 23 are provided in parallel to each other for producing the discharging plasma by ionizing the gas of the plasma chambers 21. On the other hand, the liquid crystal layer 26 is arranged on the top face of the glass substrate 20 and sandwiched by the sheet 25 of the dielectric body and a color filter 27 in which polarization filters for three colors, i.e., red, green, and blue are provided. In the color filter 27 on parallel lines which are orthogonal to the plasma chambers 21, constituted by the grooves, for example, 765 transparent electrodes 28 are provided for every 1 horizontal line. Intersecting portions of these transparent electrodes 28 and plasma chambers 21 act as 450×768 pixels. Also, the backlight 8 is provided so as to face the transparent electrodes 28 via the color filter 27 from the glass substrate 20 to give off light to the entire display screen of the PALC 10.

In the PALC 10, while the liquid crystal driver 5 is driving the transparent electrodes 28 of the pixels of every horizontal line by a video signal level of each pixel of for example a full scale of 60 V, in synchronization with the drive operation of the liquid crystal driver 5, the plasma driver 7 performs driving so as to sequentially scan the plasma chambers 21 of the PALC 10 by switching the horizontal direction lines by setting the anode electrode 22 to the ground potential and setting for example the cathode electrode to −300 V, sequentially causes plasma discharge of the plasma chambers 21, and sequentially holds the video signal level at the pixels arranged on the horizontal lines. Similarly, the video signal level is sequentially held at the pixels of every horizontal line, and the renewal of the video signal is carried out every 1 frame, thereby to display the image.

Note that, in the above-described embodiment, an explanation was made of a case where the plasma address liquid crystal apparatus was used as the liquid crystal display, but the present invention is not restricted to such a liquid crystal display and can be applied also to a case of the liquid crystal display of an active matrix system providing active elements such as transistors as the transparent electrodes of the pixels arranged, for example, in the form of matrix and driving the active elements.

As explained in detail above, by the liquid crystal display apparatus according to the present invention, when the amplitude of the video signal detected by the amplitude detecting means is small, it is possible to lower the luminance of the backlight by the luminance setting means so as to suppress a reduction in the intensity which can be displayed by the liquid crystal display. For this reason, it becomes possible to hold an optimum display state and output an image of a high grade.

Also, when the amplitude of the video signal detected by the amplitude detecting means is small, it is possible to lower the luminance of the backlight and increase the amplification rate of the amplifier by the intensity setting means so as to suppress the reduction of the intensity which can be displayed by the liquid crystal display. For this reason, it becomes possible to hold an optimum display state and display an image of a high grade.

Further, when the predetermined time is counted by the time counting means, it is possible to reduce the luminance or stop the emission of the backlight by the luminance setting means, whereby the liquid crystal display displays an image by a black level etc. For this reason, a stable display of an image of a black level etc. is possible without a necessity of supplying driving power to the liquid crystal display and supplying power to the backlight and while achieving a low power consumption.

Still further, when a transitory state of the video signal is detected by the transitory signal detecting means, it is possible to lower the luminance or stop the emission of the backlight by the luminance setting means, whereby the liquid crystal display displays an image by a black level etc. For this reason, a stable display of an image of a black level etc. is possible without a necessity of supplying driving power to the liquid crystal display and supplying power to the backlight and while achieving a low power consumption.

While the invention has been described by reference to specific embodiments chosen for purposes of illustration, it should be apparent that numerous modifications could be made thereto by those skilled in the art without departing from the basic concept and scope of the invention.

What is claimed is:

1. A liquid crystal display apparatus comprising:

amplitude detecting means receiving an input video signal for detecting an amplitude level of the input video signal;

an amplifier for amplifying the input video signal and having an amplification rate which can be freely set;

a liquid crystal display for displaying an image on a main surface thereof based on the input video signal;

a backlight for emitting a light from a back surface of the liquid crystal display to the main surface of the liquid crystal display, the light having a luminance which is set variably; and intensity setting means for lowering the luminance of the light from the backlight when the amplitude level detected by the amplitude detecting means is equal to or less than a predetermined level and for variably setting the amplification rate of the amplifier based on the amplitude detected by the amplitude detecting means.

2. A liquid crystal display apparatus comprising:

amplitude detecting means for detecting an amplitude of an input video signal;

an amplifier for amplifying the input video signal and having an amplification rate which can be freely set;

a liquid crystal display for displaying an image on a main surface thereof based on an amplified input video signal from the amplifier;

a backlight for emitting a light from a back surface of the liquid crystal display to the main surface, the light having a luminance which is set variably; and intensity setting means for variably setting the luminance of the light from the backlight and the amplification rate of the amplifier based on the amplitude detected by the amplitude detecting means.

3. A liquid crystal display apparatus comprising:

time counting means receiving an input video signal for counting a continuous time during which a signal level of the input video signal is at a non-signal level;

a liquid crystal display for displaying an image on a main surface thereof based on the input video signal;

a backlight for emitting a light from a back surface of the liquid crystal display to the main surface, the light having a luminance which is set variably; and luminance setting means for lowering the luminance of the light from the backlight when the continuous time counted by the time counting means is equal to or longer than a predetermined time.

4. A liquid crystal display apparatus comprising:

transitory signal detecting means receiving an input video signal for detecting a transitory state of the input video signal at the time of selection of a station;

a liquid crystal display for displaying an image on a main surface thereof based on the video signal;

a backlight for emitting a light from a back surface of the liquid crystal display to the main surface, the light having a luminance which is set variably; and luminance setting means for lowering the luminance of the light from the backlight when the transitory state corresponding to the selection of the station is detected by the transitory signal detecting means, so that the liquid crystal display displays a black screen.

* * * * *